July 8, 1969  L. S. TAYLOR ET AL  3,453,885
FLOAT ARM FOR GAUGES

Filed April 28, 1967  Sheet 2 of 2

United States Patent Office 3,453,885
Patented July 8, 1969

3,453,885
FLOAT ARM FOR GAUGES
Leta S. Taylor, Paul B. Johnson, and Eugene D. Huskey,
all of Box 529, Garland, Tex. 75040
Filed Apr. 28, 1967, Ser. No. 634,592
Int. Cl. G01f *23/06*
U.S. Cl. 73—317   3 Claims

ABSTRACT OF THE DISCLOSURE

A float-arm assemblage adapted to be positioned on a selected drive gear means for a liquid level gauge with stop members provided on the drive gear.

---

It is an object of the present invention to provide a novel structure so that standard parts may be provided to be selected and assembled to provide complete liquid level gauges for different services.

The liquid level gauges of the type under consideration are exemplified by Patent No. 2,578,104. Such gauges may be mounted to extend vertically downwardly into the tank in which the level of the liquid is to be gauged, or may extend horizontally into the tank, or may be mounted at an angle, or even extending upwardly into the tank.

At the end of the gauge within the tank, there is a yoke that carries a gear between its arms that drives an indicating means in a head secured to the tank. A driving gear actuated by a float is also mounted on the yoke. For different services, that is, for different liquids, different floats are required, and for different tank sizes, different lengths of gauge are required. Since the customers' needs cannot always be anticipated, it has been the practic to stock many assembled gauges of different types as to angularity, float characteristics, etc., in order to be able to fill orders promptly, as promptness of shipment is desired by the customers. This practice of keeping large stocks of assembled gauges on hand also has required storage space and has tied up funds needed for other purposes.

It is therefore a further object of the present invention to provide the following advantages:

The new one piece float assemblage and selected drive gear enables the use of one gauge for any mounting position on liquid storage tanks (from horizontal position to vertical upright position).

The one piece float and counterweight can be fabricated and stocked in desired lengths without regard to the angle of gauge mounting or degree of float travel.

Stops on the drive gear can be molded or die cast in any position. This enables pre-fabrication and ease of stocking any number of drive gears with stop positions for 0° end mount to 90° top mount gauge positions.

The gauge mounting position can be easily obtained by selecting the stock drive gear required and simply staking it to the counterweight portion of the one piece float assemblage.

This float assemblage and drive gear design enables the use of the the same or different materials (metals or plastics) for the float, float rod, counterweight and drive gear.

The option of material choice for the one piece float assemblage and drive gear increases the application possibilities for the gauge. Proper materials or combinations can be selected which are best suited to the environment of the application.

The new float assemblage and drive gear enables stock coverage for a complete range of gauge mounting positions with a lower volume of parts, a general ease of production and cost saving.

The materials of which the float, rod and counterweight are made is not material to the invention here but will be selected to suit the service. A block having at least one stud is preferably made of material that may be operated upon with a blow to rivet the stud or studs each in an aperture. Malleable plastics, plastic covered metal, or metal may be used. Metal or plastic that is resistant to breakage by a hammer blow is suggested for the gear and its lug.

Other and further objects and advantages will appear from the following specification taken with the accompanying drawing in which like reference characters refer to similar parts in the specification and in which.

Figure 1:
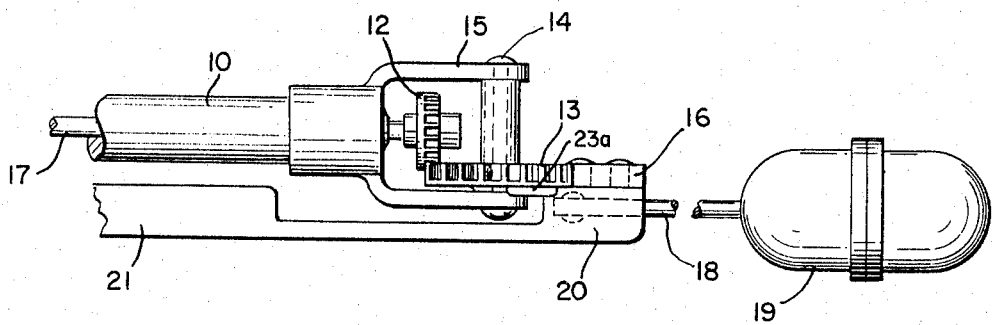
FIGURE 1 is a top or plan view of the device of the present invention with the gauge extending horizontally.
Figure 2:
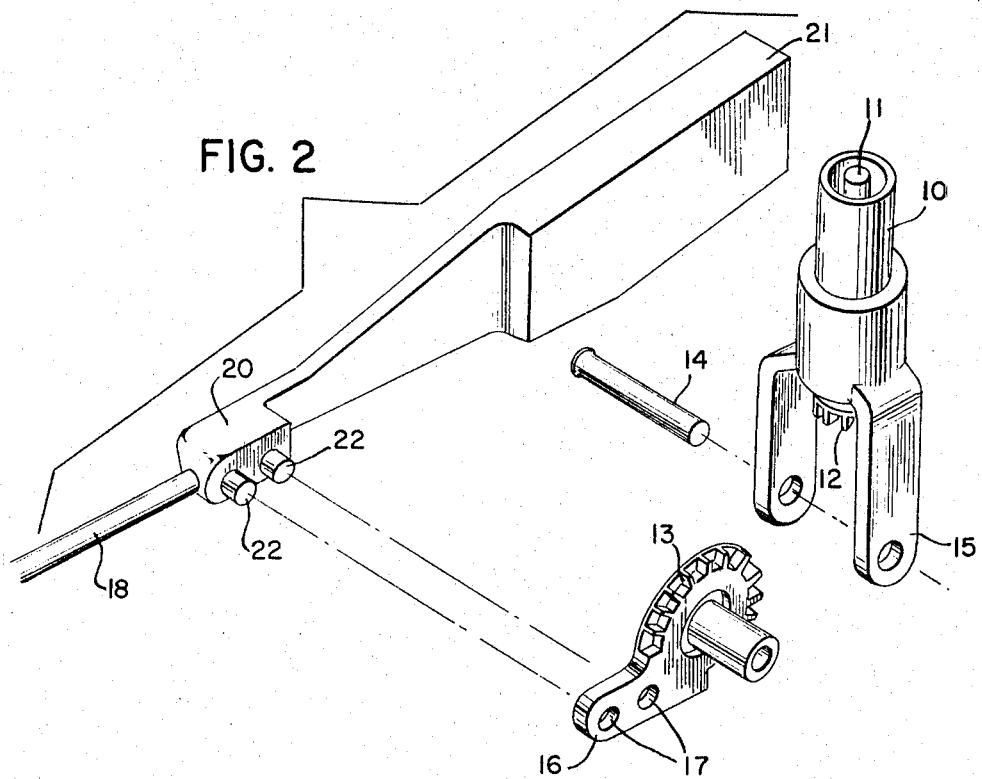
FIGURE 2 is an exploded view of the invention.

As is well known in the liquid level gauge art, gauges as exemplified by Patent No. 2,578,104 include a housing in the form of a tube 10 that extends from a gauge head (not shown herein) that is mounted on the tank. Within the housing is a drive shaft 11 that actuates an indicator in the gauge head in a known manner. The shaft is driven by a gear 12. Gear 12 is, in turn, driven by a driving gear 13 mounted on a pin 14 extending between the arms of fork 15.

An integral lug 16 extends from one edge of driving gear 13 and is provided with at least one hole 17.

A float arm 18 carrying a float 19 is mounted on a block 20 from which, or as part of which, a counterweight 21 extends. At least one stud 22 of deformable material is formed on block 20 that is of a size and position to extend through aperture 17 of lug 16. Stud 22, being of deformable material, may be riveted after having been inserted into aperture 17 to securely hold the float, float arm and counterweight assembly in position on gear 13 so that as the float is moved by changes of liquid level in a tank, gear 13 will be actuated to pivot on pin 14.

Nylon is a preferred plastic material for gear 13.

It will be understood that while the two round studs 22 are shown, a single square or oblong stud may be used or a single stud and a deformation of the surfaces of the lug 16 and the block 20 may be provided.

Figure 3:
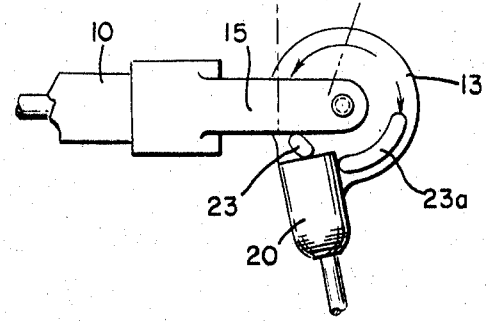
FIGURE 3 is a side view of the device as seen in FIGURE 1.
Figure 4:
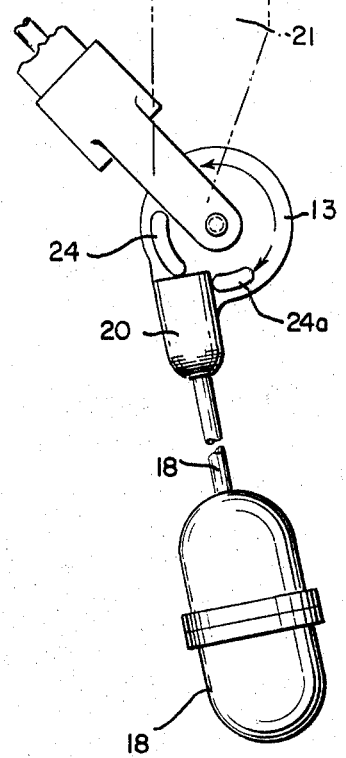
FIGURE 4 is a view similar to FIGURE 3, but with the gauge extending at a 45° angle into the tank.
Figure 5:
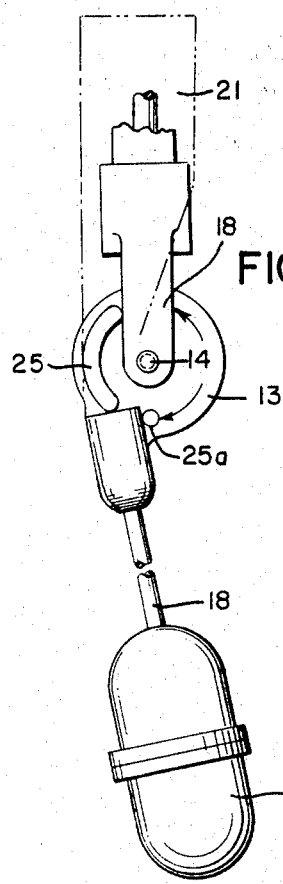
FIGURE 5 is a view similar to FIGURES 3 and 4 with the gauge extending vertically downwardly.
Figure 6:
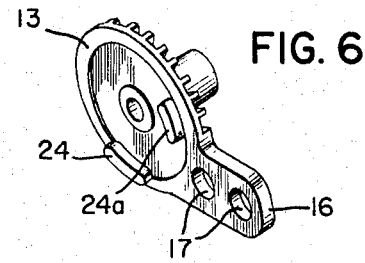
FIGURE 6 is a detailed perspective view of a gear.

As will be seen from FIGURES 3, 4 and 5, gear 13 may be provided with stops 23, 23a in FIGURE 3; 24, 24a in FIGURE 4; or 25, 25a in FIGURE 5. Where the gauge housing or stem 10 is to extend horizontally into the tank stops 23, 23a are used. FIGURE 4 shows stops 24, 24a that are used where the housing or stem 10 extends at an angle, and in FIGURE 5 stops 25, 25a are arranged to permit use of the gauge where stem 10 is vertical. These stops are desirable since, as seen in FIGURE 5, if the float inadvertently passed to the left of the vertical projection of pin 14, the float would swing clockwise in this figure as the liquid level rose in the tank, which would not give a correct reading of the gauge, and indeed, the float could not rise to the upper portions of the tank as the block would necessarily contact the arm of fork 15. Similarly, the stops in FIGURES 3 and 4 insure proper functioning of the gauge by permitting the arm to swing through the desired angle.

It will be seen then, that the novel structure makes it possible to manufacture a plurality of gauge heads with the housing 10 carrying the shaft 11, drive gear 12 and fork 15. All of these may be identical for a certain size of tank. A plurality of float arms 18 carrying floats 19 and counterweight 21 extending from block 20 may be made, the length of arm 18 being appropriate for the change of level of the liquid in the tank in which the gauge is to be used; and a plurality of gears 13 may be provided, some with stops 23, 23a, some with stops 24, 24a, and some with stops 25, 25a. It is clear, then, that upon receipt of an order it is necessary only to assemble a float arm 18, 19, 20, 21 on a gear 13 having stops, according to FIGURE 3, 4, 5 or other desired similar gear according to the order. This assembly requires only the placing of studs 22 in the apertures 17 and riveting the studs; the gear 13 is then mounted in the fork 15 in proper mesh with gear 12 by means of pin 14.

It will be seen, therefore, that by providing the structure of the float rod and counterweight with its studs, and providing the driving gear with its stops, and its apertures to receive the studs of the float arm, a structure results that makes it possible for the manufacturer of liquid level gauges to fill orders for many different gauges promptly from stock without having completely assembled stocks of each type of gauge that might be ordered.

We therefore claim:

1. In a liquid gauge having a tube adapted to extend into a tank, a shaft within said tube, a gear-carrying fork at the end of said tube, a first bevel gear mounted on said shaft between the arms of said fork coaxial with said tube, a second bevel gear mounted in said fork with its axis normal to the axis of said shaft and meshing with said first bevel gear, an integral lug extending generally tangentially from said second gear in the plane thereof, a block of material formed with at least one deformable stud, a float arm and a counterweight mounted on said block, said integral lug being provided with an aperture to receive said stud, whereby said float arm and counterweight may be secured to said gear to extend generally tangentially therefrom and two stop elements extending axially from said second gear on the side thereof adjacent the nearer arm of said fork to contact opposite sides of said arm, said stop elements being positioned one adjacent each side of said block when it is secured to said gear to limit the angle through which said second gear may rotate, the position of said stop elements circumferentially of said gear conforming to the angular position in which said gauge is to be used and selection of the said second gear being determined by said angular position.

2. The assembly of claim 1 in which said gear and lug are of nylon.

3. The assembly of claim 1 in which the stud is of malleable metal.

References Cited

UNITED STATES PATENTS

| | | | |
|---|---|---|---|
| 714,377 | 11/1902 | Jeavons | 73—317 |
| 1,278,469 | 9/1918 | Horton | 73—317 |
| 1,937,231 | 11/1933 | Klein | 73—317 X |
| 2,584,446 | 2/1952 | Hastings et al. | 73—317 |
| 3,320,806 | 5/1967 | Johnson et al. | 73—317 |

FOREIGN PATENTS

| | | |
|---|---|---|
| 22,389 | 1/1921 | France. |
| 6,805 | 11/1904 | Great Britain. |

OTHER REFERENCES

Publication: Nylon in Bearings and Gears, by William C. Wall, product engineering, July 1950, pp. 102–3.

LOUIS R. PRINCE, *Primary Examiner.*

DANIEL M. YASICH, *Assistant Examiner.*

U.S. Cl. X.R.

74—469